(12) United States Patent
Haimerl et al.

(10) Patent No.: US 9,108,493 B2
(45) Date of Patent: Aug. 18, 2015

(54) VEHICLE CONSTRUCTION HAVING ROLL BARS AND A CONVERTIBLE ROOF

(71) Applicant: Webasto-Edscha Cabrio GmbH, Stockdorf (DE)

(72) Inventors: Alexander Haimerl, Bogen (DE); Georg Kopp, Plattling (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 22 days.

(21) Appl. No.: 14/097,034

(22) Filed: Dec. 4, 2013

(65) Prior Publication Data
US 2015/0151618 A1    Jun. 4, 2015

(51) Int. Cl.
*B60J 7/00*    (2006.01)
*B60J 7/06*    (2006.01)
*B60R 21/13*    (2006.01)

(52) U.S. Cl.
CPC .............. *B60J 7/061* (2013.01); *B60R 21/13* (2013.01); *B60R 2021/132* (2013.01)

(58) Field of Classification Search
CPC ..... B60R 21/13; B60R 2021/132; B60J 7/061
See application file for complete search history.

(56) References Cited

U.S. PATENT DOCUMENTS

| 5,558,388 | A  | * | 9/1996  | Furst et al. ................. 296/107.2 |
| 5,673,959 | A  | * | 10/1997 | Padlo ............................ 296/116  |
| 6,435,606 | B1 |   | 8/2002  | Miklosi et al.                           |
| 6,938,949 | B1 | * | 9/2005  | Peart ......................... 296/190.08 |
| 7,032,927 | B1 | * | 4/2006  | Joranlien ...................... 280/756   |
| 2007/0138780 | A1 | * | 6/2007  | Beki ............................. 280/756 |
| 2008/0284200 | A1 | * | 11/2008 | Dilluvio et al. .......... 296/107.09 |
| 2009/0278342 | A1 | * | 11/2009 | Browne et al. ................. 280/756 |
| 2010/0078925 | A1 | * | 4/2010  | Froschle ....................... 280/756 |

FOREIGN PATENT DOCUMENTS

DE    19939724 C1    2/2001

* cited by examiner

*Primary Examiner* — Lori L Lyjak
(74) *Attorney, Agent, or Firm* — Fitch, Even, Tabin & Flannery LLP (57) ABSTRACT

A vehicle construction having one roll bar respectively on both sides relative to a vertical longitudinal center plane of the vehicle construction and a convertible roof, the roll bar extending in the vehicle longitudinal direction and supporting itself in the rear region of the vehicle construction, and the convertible roof being displaceable between a closed position spanning a vehicle interior as well as the roll bars and an uncovered position uncovering the vehicle interior to the top and including a linkage, which can have a link arrangement on both sides, pivotably mounted at a main bearing fixed relative to the vehicle construction. The main bearings and/or the link arrangements each include at least one bridging element, which reaches over the respective roll bar and to which at least one link of the link arrangement is linked.

14 Claims, 7 Drawing Sheets

VEHICLE CONSTRUCTION HAVING ROLL BARS AND A CONVERTIBLE ROOF

TECHNICAL FIELD

The invention relates to a vehicle construction which comprises a roll bar respectively on both sides relative to a vertical longitudinal center plane of the vehicle construction and a convertible roof, said roll bar extending in the vehicle longitudinal direction, and said convertible roof being displaceable between a closed position spanning a vehicle interior and an uncovered position uncovering the vehicle interior to the top.

BACKGROUND

A vehicle construction having a convertible roof, which is displaceable between a closed position spanning a vehicle interior and an uncovered position uncovering the vehicle interior to the top, is known, for example, from the document DE 199 39 724 C1. Said convertible roof comprises a rear roof cassette, which limits a folding roof portion in the rear, which portion can be unfolded or advanced as far as to a front apron of the vehicle for spanning a vehicle interior. For displacing the folding roof into the uncovered position, the same is accommodated by the roof cassette, which can then be stored in a rear storage space by means of pivoting.

Usually, convertible roofs that can be folded are provided with a linkage, which comprises one link arrangement respectively on both sides relative to a vertical longitudinal center plane of the vehicle construction, said link arrangement being pivotably mounted at a main bearing that is fixed relative to the vehicle construction. The main bearing that is fixed relative to the vehicle construction is usually arranged in the rear storage space.

Furthermore, it is known to provide a vehicle construction, which is provided with a convertible roof that is displaceable and with a roll cage which comprises one roll bar respectively on both sides relative to the vertical longitudinal center plane of the vehicle construction, said roll bar extending in the vehicle longitudinal direction. Said roll bars are connected to one another by means of transverse struts. The roll cage serves as a protection for the passengers if the respective vehicle overturns in an accident.

It is further known to provide a vehicle, which is equipped with a roll cage and with a convertible roof that is displaceable. Here, the convertible roof is fixed to the roll cage with its main bearings, namely at the roll bars that extend in the vehicle longitudinal direction on the side thereof facing the longitudinal center plane of the vehicle construction. This is a disadvantage in respect of the possible design and of the arrangement of the roll cage. Furthermore, in the closed position of the convertible roof, too, large parts of the storage space are filled by the convertible roof or by the main bearings of the convertible roof and by the linkage, which is, in turn, at the expense of a possible loading space.

SUMMARY

It is an object of the invention to create a vehicle construction which comprises, on the one hand, one roll bar respectively on both sides relative to a vertical longitudinal center plane of the vehicle construction and a convertible roof, said roll bar extending in the vehicle longitudinal direction, and said convertible roof being designed in an optimized manner in respect of the loading space available in the rear region of the vehicle construction.

According to the invention, a vehicle construction is therefore proposed which comprises a roll bar respectively on both sides relative to a vertical longitudinal center plane of the vehicle construction and a convertible roof, said roll bar extending in the vehicle longitudinal direction and supporting itself in the rear region of the vehicle construction, and said convertible roof being displaceable between a closed position spanning a vehicle interior as well as the roll bars and an uncovered position uncovering the vehicle interior to the top and including a linkage, which comprises a link arrangement on both sides, which is pivotably mounted at a main bearing that is fixed relative to the vehicle construction, wherein the main bearings and/or the link arrangements each include at least one bridging element, which reaches over the respective roll bar and to which at least one link of the link arrangement is linked. By means of the bridging element, it is possible to arrange parts of the kinematics or of the linkage on the outer side of the respective roll bar relative to the vertical longitudinal center plane of the vehicle construction, and to arrange parts of the kinematics on the inner side of the respective roll bar. In this way, the space which is available in the respective vehicle can be utilized in an optimized manner.

The bridging element can be a bridging bracket of the main bearing, to which a link of the respective link arrangement is articulated. Alternatively, the bridging element can be a bridging piece of the link arrangement itself, which extends in the vehicle transverse direction and to which a link of the respective link arrangement is linked in a torque-proof or in a pivotable manner.

In a preferred embodiment, the bridging bracket of the main bearing is substantially designed to be U-shaped cross-sectionally, wherein the link of the respective link arrangement is arranged at the leg of the bridging bracket which is arranged on the side of the respective roll bar facing the vertical longitudinal center plane.

The main bearing is preferably fixed to the roll bar. In this way, the main bearings, in an expedient manner, support themselves at a component of the vehicle construction that is fixed relative to the vehicle construction.

The main bearing can be fixed to the roll bar directly or indirectly via the bridging bracket.

In a special embodiment of the vehicle construction, the link, which is articulated to the bridging bracket, is a support link of a rear window of the convertible roof. In alternative embodiments, other links of the kinematics can also be articulated to the bridging bracket. In any case, the kinematics are partially arranged on the inner sides of the roll bars and partially on the outer sides of the roll bars, relative to the vertical longitudinal center plane of the vehicle construction in each case.

The rear window can additionally be connected to a drive link, which is connected to a main link of the respective link arrangement in a torque-proof manner, the main link being pivotably mounted at the respective main bearing. The drive link can be linked to the rear window via a coupling link, which serves to control a tilting movement of the rear window when displacing the convertible roof.

Relative to the respective roll bar, the drive link of the rear window can be arranged on the inner side facing the vertical longitudinal center plane of the vehicle construction and the main link can be arranged on the outer side facing away from the vertical longitudinal center plane of the vehicle construction, wherein, between the drive link and the main link, the bridging piece of the link arrangement is arranged, the same extending in the vehicle transverse direction. This means that the bridging piece also enables arranging kinematics elements on both sides of the roll bars or inside and outside of a roll cage.

The convertible roof can comprise a rear cassette, which forms a roof rear region in the rear of the vehicle in the closed position of the convertible roof and which can be lowered for displacing the convertible roof into the uncovered position by means of the linkage.

Preferably, the roll bars are parts of a roll cage.

The convertible roof, which comprises the linkage and the main bearings, is preferably mounted as a unit to the roll bars. In particular, mounting is effected in such a manner that the convertible roof, in its uncovered position, is delivered to a production line for the respective vehicle, being assembled completely, that means including the main bearings, engines, linkages and convertible roof cloth, and that it is inserted, as a unit, into the vehicle from the rear and the top and is fixed to the roll bars.

Further advantages and advantageous configurations of the subject-matter of the invention can be taken from the description, the drawing and the claims.

DETAILED DESCRIPTION

In the drawing, a vehicle construction 10 is illustrated, which is part of a passenger car designed as an all-terrain vehicle. The vehicle construction 10 comprises a body 12, which is provided with a roll cage 14. The roll cage comprises one roll bar 16 respectively on both sides relative to a vertical longitudinal center plane of the vehicle construction, said roll bar extending in the vehicle longitudinal direction and supporting itself in the rear region at the vehicle body 12. The roll bars 16, which are arranged on both sides, are connected to each other via roll struts 18, which extend in the vehicle transverse direction, forming the roll cage together with said struts.

The vehicle construction 10 is provided with a convertible roof 20, which is displaceable and which is designed as a folding roof in the broadest sense and includes a folding roof portion 22, which, in the closed position, forms the actual vehicle roof and which is guided between two lateral longitudinal roof struts 24 laterally limiting the vehicle roof and thus forming one lateral longitudinal roof beam respectively. On its rear side, the folding roof portion 22 is linked to a roof cassette 26, which accommodates a displacing mechanism for the folding roof portion 22 and forms a rear region of the vehicle roof in the closed position. The convertible roof 20 comprises, in a region situated below the roof cassette 26 in the closed position, a rear window 28, which is also designed to be displaceable.

Figure 1:
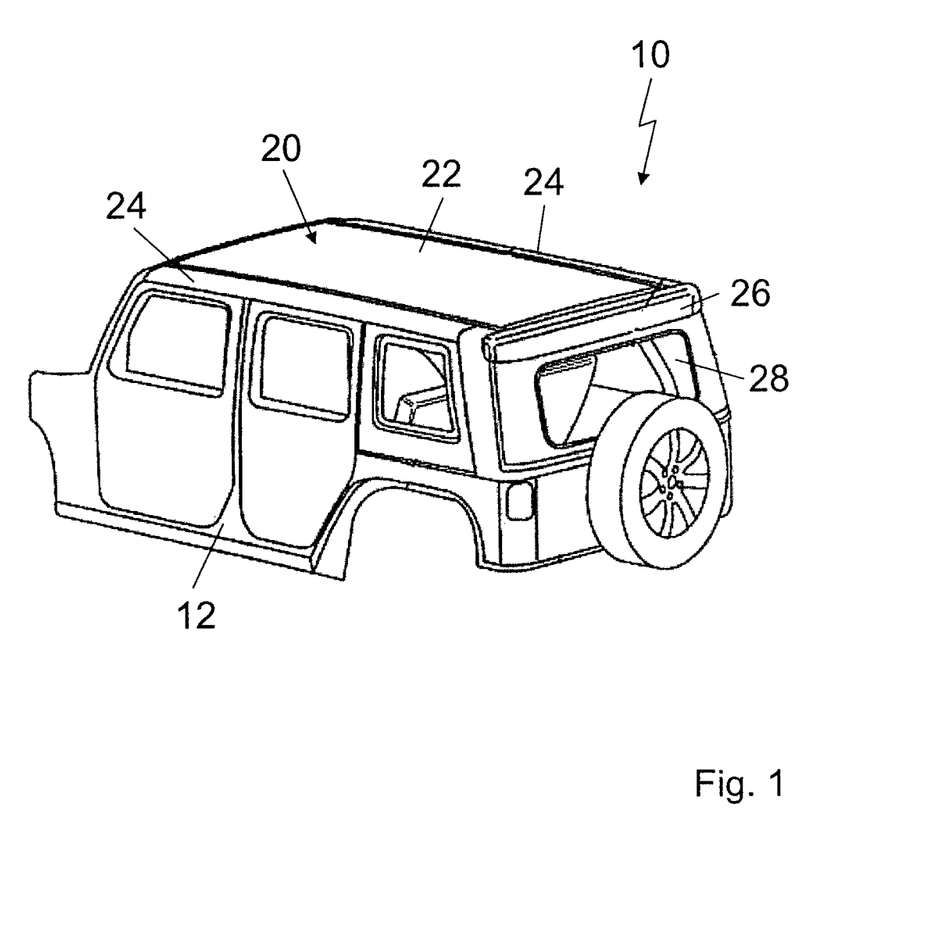
FIG. 1 shows a vehicle construction having a convertible roof that is displaceable in its closed position.
Figure 2:
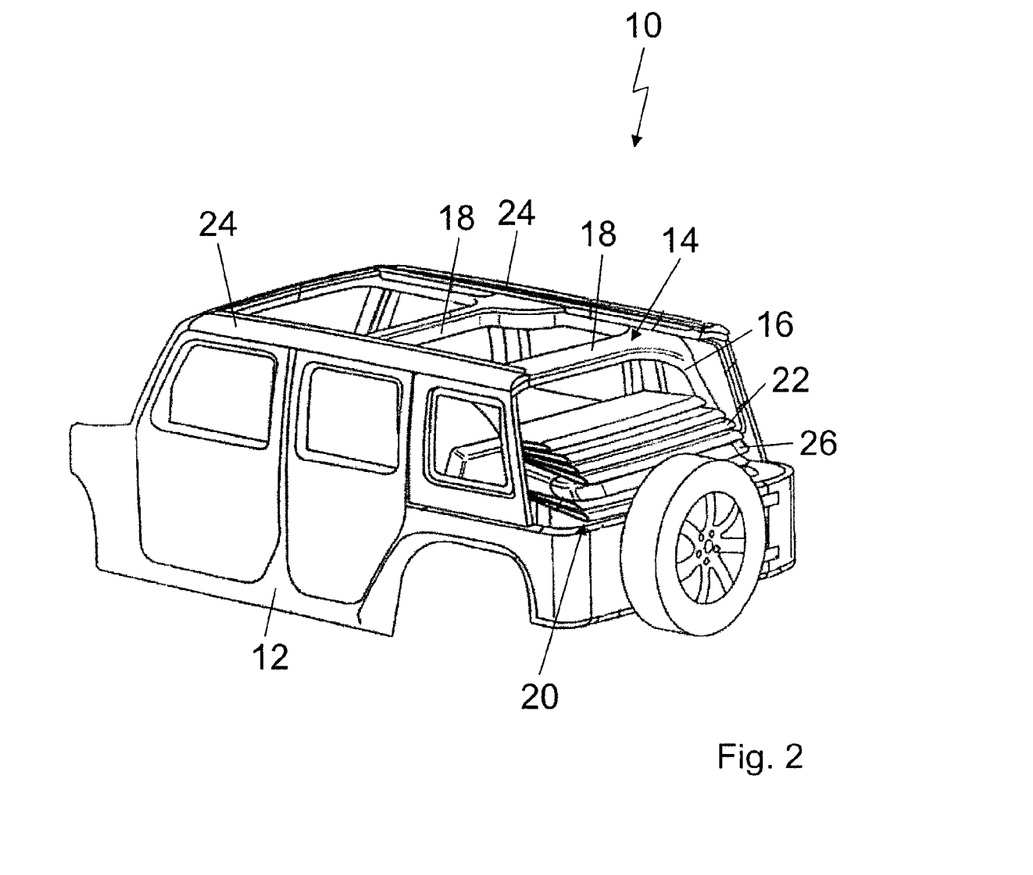
FIG. 2 shows the vehicle construction according to FIG. 1, having the convertible roof that is displaceable in its uncovered position.
Figure 3:
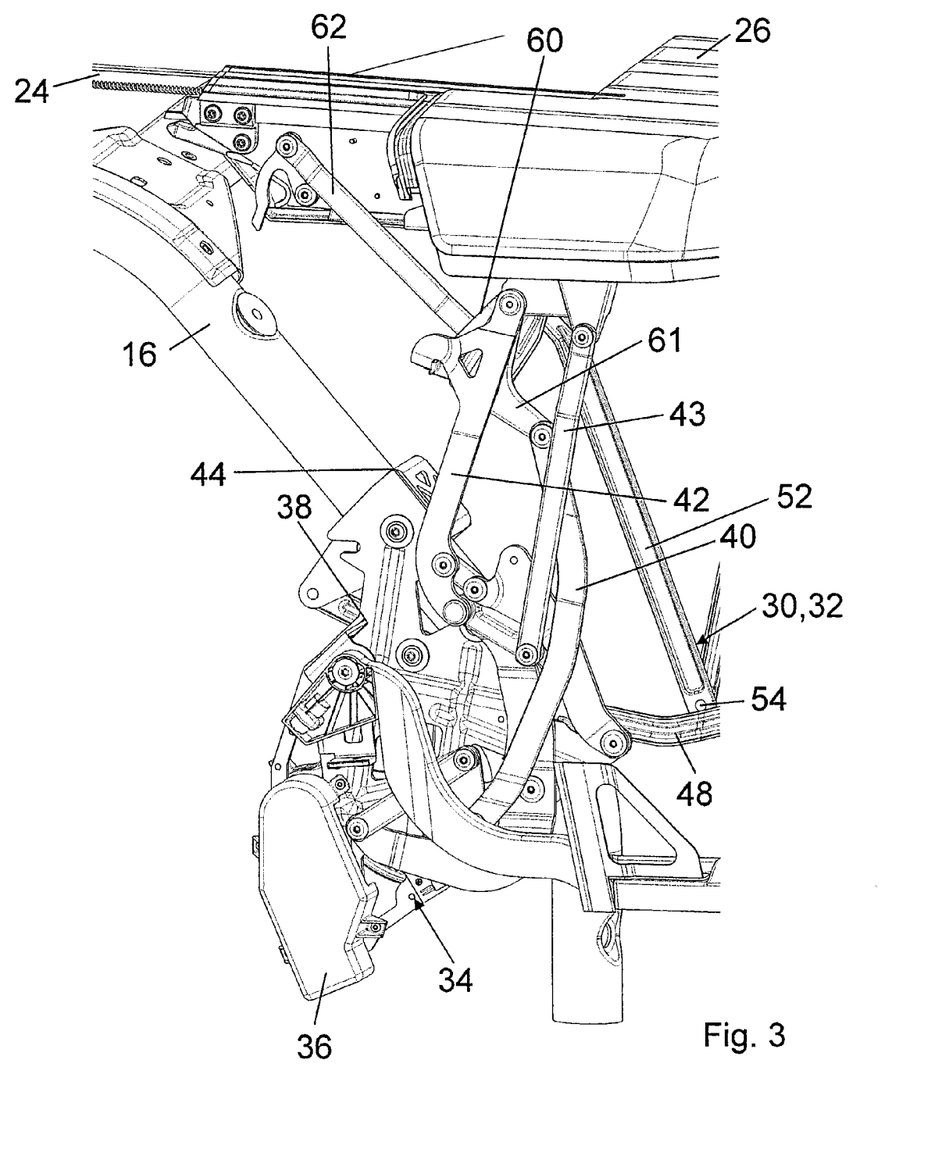
FIG. 3 shows an enlarged side view of the convertible roof in its rear region without showing a convertible roof cloth and in the closed position.
Figure 4:
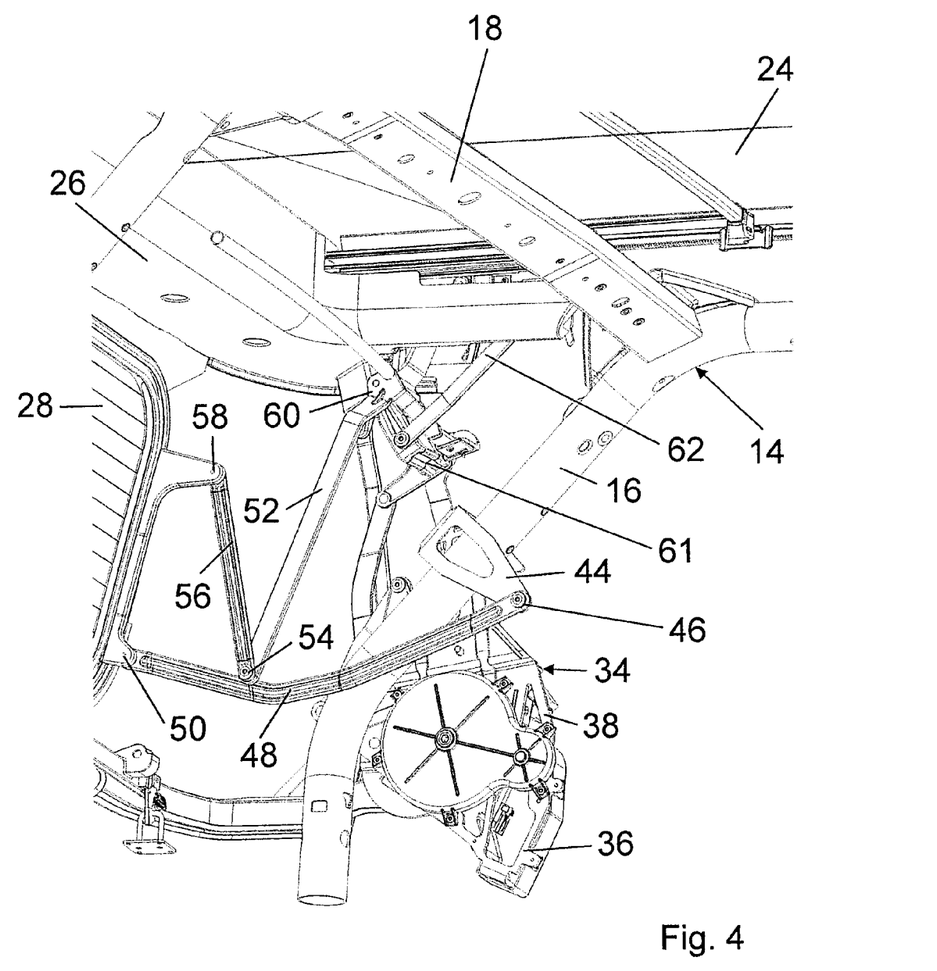
FIG. 4 shows an inside view of the rear region according to FIG. 3.

In order to move the convertible roof 20 from the closed position illustrated in FIG. 1 into the storage position illustrated in FIG. 2, the folding roof portion 22 is initially moved into the roof cassette 26 in the rear direction, such that the same can be lowered together with the folding roof portion 22 for being accommodated in a rear convertible roof storage space. In order to be able to lower the roof cassette 26, the rear window 28 is swung forward.

In FIGS. 3 to 7, a linkage 30, which is required for displacing the convertible roof 20, is illustrated. The linkage 30 comprises one link arrangement 32 respectively on both sides relative to the vertical longitudinal center plane of the vehicle construction, said link arrangement being pivotably connected to a main bearing 34. The main bearing 34 is welded to the roll bar 16 or mechanically connected in any other manner, for example screwed or riveted. The entire convertible roof 20 is mounted to the vehicle construction and the roll cage, respectively, via the main bearings.

In the drawing and in the following description, it is only referred to the link arrangement 32 which is arranged on the left in the forward direction of travel of the respective vehicle. The link arrangement which is arranged on the right in the forward direction of travel is designed in a manner corresponding thereto mirror-symmetrically. For reasons of clarity, the detailed description thereof is omitted.

The main bearing 34 comprises an outer portion 38 which is arranged outside of the roll cage 14 and at which a drive engine 36 is arranged amongst other things. A main link 43 and a main pillar 42 are furthermore articulated to the outer portion 38 of the main bearing 34, said elements being connected to the roof cassette 26 in an articulated manner with their ends facing away from the main bearing 34.

Figure 5:
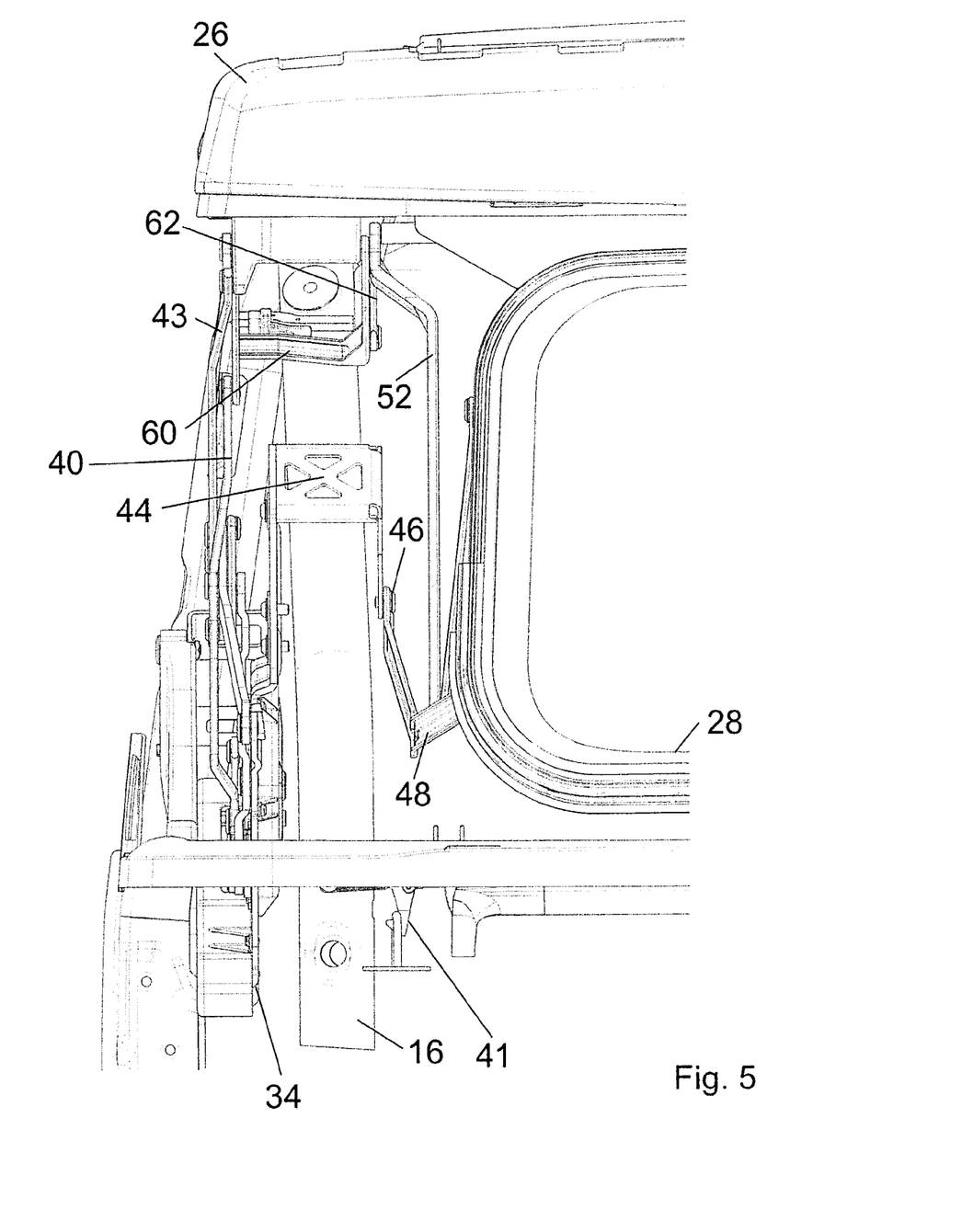
FIG. 5 shows a rear view of the linkage in the region of a roll bar in the closed position of the convertible roof.
Figure 6:
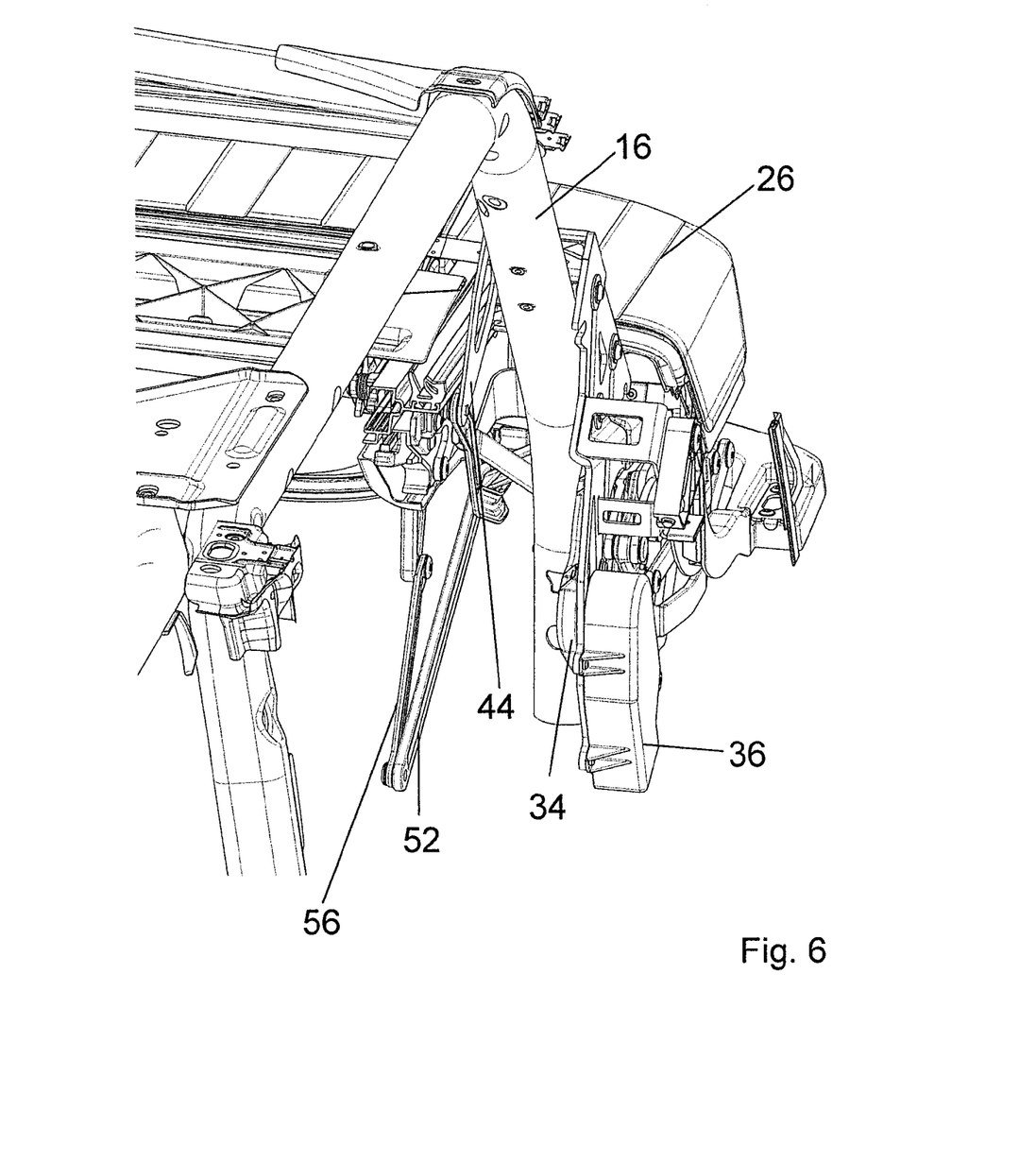
FIG. 6 shows a perspective front view of the linkage in its storage position in the region of the roll bar.
Figure 7:
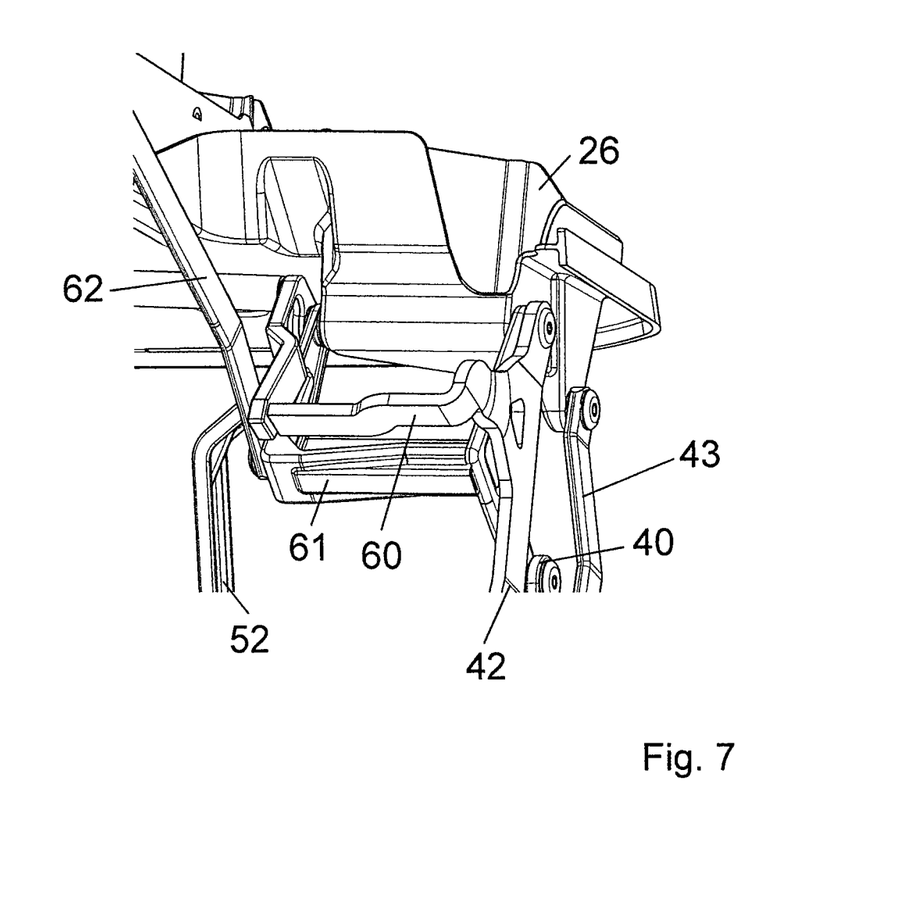
FIG. 7 shows an enlarged view of the linkage in the region of a bridging piece between an outer main link and an inner drive link for a rear window.

Furthermore, the main bearing 34 comprises a bridging bracket 44, which reaches over the roll bar 16 from the outside to the inside toward the vertical longitudinal center plane of the vehicle construction and which, as can be taken from FIG. 5 for example, has a cross-section of substantially inverted U-shape. A support link 48 is articulated to a leg of the bridging bracket 44, which is arranged inside of the roll cage 14, that means on the inner side of the roll bar 16 relative to the vertical longitudinal center plane of the vehicle construction, and which forms an inner portion of the main bearing 34, via a hinge 46, said support link being connected to the rear window 28 via a hinge 50. By means of the bridging bracket 44, it is thus possible to arrange parts of the kinematics of the convertible roof 20 outside of the roll cage 14 and to arrange parts of the kinematics of the convertible roof 20 inside of the roll cage 14.

In order to be able to pivot the rear window 28 with respect to the support link 48, a drive link 52 is envisaged, which is connected to a coupling link 56 via a hinge 54, said coupling link again being articulated to the rear window 28 via a hinge 58.

The drive link 52 is connected to the main pillar 42 in a torque-proof manner via a first bridging piece 60, which extends in the vehicle transverse direction. By means of the bridging piece 60, which reaches over the roll bar 16, it is possible to arrange the drive link 52 and the coupling link 56 inside of the roll cage 14, that means on the inner side of the roll bar 16 relative to the vertical longitudinal center plane of the vehicle construction, whereas the main link 43 and the main pillar 42 are arranged on the outer side thereof.

The link arrangement 32 furthermore comprises a second bridging piece 61, which extends in the vehicle transverse direction, and to which a coupling link 40 is articulated on the outer side of the roll bar 16, said coupling link being articulated in the region of the main bearing 34 with its end facing away from the bridging piece 61. On the inner side of the roll bar, a locking link 62 is articulated to the second bridging piece 61, by means of which locking link the roof cassette 26 can be locked in the respective longitudinal roof strut 24.

LIST OF REFERENCE NUMERALS

10 Vehicle construction
12 Body
14 Roll cage
16 Roll bar
18 Roll struts
20 Convertible roof
22 Folding roof portion
24 Longitudinal roof struts
26 Roof cassette
28 Rear window
30 Linkage
32 Link arrangement
34 Main bearing
36 Drive engine
38 Outer portion
40 Coupling link
41 Locking elements
42 Main pillar
43 Main link
44 Bridging bracket
46 Hinge
48 Support link
50 Hinge
52 Drive link
54 Hinge
56 Coupling link
58 Hinge
60 Bridging piece
61 Bridging piece
62 Locking link

The invention claimed is:

1. A vehicle construction which comprises one roll bar respectively on both sides relative to a vertical longitudinal center plane of the vehicle construction and a convertible roof, said roll bar extending in the vehicle longitudinal direction and supporting itself in the rear region of the vehicle construction, and said convertible roof being displaceable between a closed position spanning a vehicle interior as well as the roll bars and an uncovered position uncovering the vehicle interior to the top and including a linkage, which comprises a link arrangement on both sides, which is pivotably mounted at a main bearing that is fixed relative to the vehicle construction, wherein the main bearings and the link arrangements each include at least one bridging element, which reaches over the respective roll bar and to which at least one link of the link arrangement is linked.

2. A vehicle construction according to claim 1, wherein the bridging element is a bridging piece of the respective link arrangement, to which a link of the respective link arrangement is connected on both sides.

3. The vehicle construction according to claim 1, wherein the bridging element is a bridging bracket of the main bearing, which is substantially designed to be U-shaped cross-sectionally and the link of the respective link arrangement is articulated to the leg of the bridging bracket which is arranged at the side of the respective roll bar facing the vertical longitudinal center plane.

4. The vehicle construction according to claim 1, wherein the main bearing is fixed to the roll bar.

5. The vehicle construction according to claim 3, wherein the main bearing is fixed to the roll bar via the bridging bracket.

6. The vehicle construction according to claim 3, wherein the link, which is articulated to the bridging bracket, is a support link of a rear window of the convertible roof.

7. The vehicle construction according to claim 1, wherein a rear window is connected to a drive link, which is connected to a main pillar of the respective link arrangement in a torque-proof manner, the main pillar being pivotably mounted at the respective main bearing.

8. The vehicle construction according to claim 7, wherein the drive link is linked to the rear window via a coupling link.

9. The vehicle construction according to claim 7, wherein, relative to the respective roll bar, the drive link of the rear window is arranged at the inner side facing the vertical longitudinal center plane of the vehicle construction and the main link is arranged at the outer side facing away from the vertical longitudinal center plane of the vehicle construction and between the drive link and the main link, a bridging element which forms the bridging piece is arranged which extends in the vehicle transverse direction.

10. The vehicle construction according to claim 1, wherein the convertible roof comprises a rear cassette, which forms a roof rear region in the rear of the vehicle in the closed position of the convertible roof and which can be lowered for displacing the convertible roof into the uncovered position by means of the linkage.

11. The vehicle construction according to claim 1, wherein the roll bars are parts of a roll cage.

12. The vehicle construction according to claim 1, wherein the convertible roof, which comprises the linkage and the main bearings, is mounted as a unit to the roll bars.

13. A vehicle construction which comprises one roll bar respectively on both sides relative to a vertical longitudinal center plane of the vehicle construction and a convertible roof, said roll bar extending in the vehicle longitudinal direction and supporting itself in the rear region of the vehicle construction, and said convertible roof being displaceable between a closed position spanning a vehicle interior as well as the roll bars and an uncovered position uncovering the vehicle interior to the top and including a linkage, which comprises a link arrangement on both sides, which is pivotably mounted at a main bearing that is fixed relative to the vehicle construction, wherein the main bearings include at least one bridging element, which reaches over the respective roll bar and to which at least one link of the link arrangement is linked.

14. A vehicle construction which comprises one roll bar respectively on both sides relative to a vertical longitudinal center plane of the vehicle construction and a convertible roof, said roll bar extending in the vehicle longitudinal direction and supporting itself in the rear region of the vehicle construction, and said convertible roof being displaceable between a closed position spanning a vehicle interior as well as the roll bars and an uncovered position uncovering the vehicle interior to the top and including a linkage, which comprises a link arrangement on both sides, which is pivotably mounted at a main bearing that is fixed relative to the vehicle construction, wherein the link arrangements each include at least one bridging element, which reaches over the respective roll bar and to which at least one link of the link arrangement is linked.

* * * * *